United States Patent
Botterill et al.

(10) Patent No.: US 10,909,502 B2
(45) Date of Patent: Feb. 2, 2021

(54) CONFIGURATION MANAGEMENT SYSTEM FOR LARGE-SCALE CAPITAL PROJECTS

(71) Applicant: Hexagon Technology Center GmbH, Heerbrugg (CH)

(72) Inventors: Ewan D. Botterill, Wales (GB); Alain Mouyal, Huntsville, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 330 days.

(21) Appl. No.: 15/286,088

(22) Filed: Oct. 5, 2016

(65) Prior Publication Data

US 2017/0286910 A1 Oct. 5, 2017

Related U.S. Application Data

(60) Provisional application No. 62/315,178, filed on Mar. 30, 2016.

(51) Int. Cl.
| | |
|---|---|
| *G06Q 10/06* | (2012.01) |
| *G06Q 10/10* | (2012.01) |
| *G06F 8/71* | (2018.01) |
| *G06F 9/445* | (2018.01) |
| *G06Q 50/04* | (2012.01) |

(52) U.S. Cl.
CPC ............ *G06Q 10/103* (2013.01); *G06F 8/71* (2013.01); *G06F 9/44505* (2013.01); *G06Q 10/06313* (2013.01); *G06Q 10/101* (2013.01); *G06Q 50/04* (2013.01); *Y02P 90/30* (2015.11)

(58) Field of Classification Search
CPC ................ G06Q 10/06; G06Q 10/10
USPC ................................................. 705/7.23
See application file for complete search history.

(56) References Cited

U.S. PATENT DOCUMENTS

| | | | |
|---|---|---|---|
| 7,278,106 B1 | 10/2007 | Mason | 715/744 |
| 7,774,324 B1* | 8/2010 | Henderson | G06Q 10/06 705/2 |
| 8,631,161 B2 | 1/2014 | Lavrov et al. | 709/248 |
| 8,732,125 B2 | 5/2014 | Omansky et al. | 707/621 |
| 9,274,782 B2 | 3/2016 | Adderly et al. | 717/170 |
| 2003/0110067 A1* | 6/2003 | Miller | G06Q 10/06 705/7.23 |
| 2003/0212716 A1 | 11/2003 | Steele et al. | 707/203 |
| 2006/0235732 A1* | 10/2006 | Miller | G06Q 10/06 705/7.23 |
| 2008/0183532 A1* | 7/2008 | Barnard | G06Q 10/063 705/7.14 |
| 2010/0106654 A1 | 4/2010 | Simpson et al. | 705/300 |
| 2013/0254741 A1 | 9/2013 | Spassov et al. | 717/110 |
| 2013/0339078 A1 | 12/2013 | Harris et al. | 705/7.23 |
| 2015/0188748 A1 | 7/2015 | Watariuchi | H04L 41/046 |
| 2016/0350673 A1* | 12/2016 | Kumar | G06N 99/005 |

OTHER PUBLICATIONS

International Searching Authority, International Search Report—Application No. PCT/US2016/055506, dated Dec. 6, 2016, together with the Written Report of the International Searching Authority, 10 pages.

* cited by examiner

*Primary Examiner* — Nga B Nguyen
(74) *Attorney, Agent, or Firm* — Nutter McClennen & Fish LLP

(57) ABSTRACT

A configuration management system more efficiently and effectively manages template configuration information across a plurality of large-scale capital projects that execute multiple applications at a plurality of project sites.

22 Claims, 5 Drawing Sheets

CONFIGURATION MANAGEMENT SYSTEM FOR LARGE-SCALE CAPITAL PROJECTS

PRIORITY

This patent application claims priority from provisional U.S. patent application No. 62/315,178, filed Mar. 30, 2016, entitled, "Method and Apparatus for Managing Template Configuration Information Across a Plurality of Large Scale Projects," and naming Ewan D. Botterill and Alain Mouyal as inventors, the disclosure of which is incorporated herein, in its entirety, by reference.

FIELD OF THE INVENTION

The invention generally relates to large-scale capital projects for building units and construction elements and, more particularly, the invention relates to configuration management systems used with large scale capital projects of building units and constructions elements, such as power plants.

BACKGROUND OF THE INVENTION

Design, construction, and management of large-scale capital projects, such as process plants (e.g., oil refineries and pharmaceutical plants), power plants (e.g., a coal fueled power generation facility), ships (e.g., military shipping, cruise ships, or cargo ships), and off-shore oil platforms, requires coordination of processes and configuration data on a scale that is orders of magnitude greater than those of smaller, common projects (e.g., building and selling a ten room house). Large-scale capital projects consequently often require a substantially more comprehensive production and management solution.

In response to this need, those skilled in the art have developed comprehensive plant design programs (e.g., SmartPlant® Enterprise, distributed by Intergraph, Inc. of Huntsville, Ala.) that are specially configured for the rigors of such large capital projects. Among other things, this type of plant design program can be implemented as a broad application suite that manages most or all phases of a large-scale capital project, from initial conception, to design, construction, handover, maintenance, management, and decommissioning.

Many plant design programs often generate a template from which users access specific configuration data to develop and manage various phases of their capital projects. Each project template has thousands of different types of configuration data and requirements (often tens of thousands) that are difficult to maintain and update as the projects progresses. Prior art configuration management systems known to the inventors are not well suited to handle such volumes of data.

SUMMARY OF VARIOUS EMBODIMENTS

In accordance with one embodiment of the invention, a method manages template configuration information with a configuration management system ("CMS") across a plurality of large-scale capital projects that execute multiple applications at a plurality of project sites. To that end, the method forwards, from a central site having a master template with a plurality of master template configuration options, a project template to the plurality of project sites. Since it is based on the master template, the project template may have thousands of project configuration options for developing the large-scale capital projects. The method also may update, at the central site, the master template configuration options, and forward to the plurality of project sites and/or one or more staging areas, from the central site, the updated master template configuration options. Each project template has a set of existing project configuration options prior to receipt of the updated master template configuration options.

Using one or more automated comparators, at respective project sites and/or the staging area(s), the method determines differences between the updated master template configuration options and existing project configuration options for each project. The one or more automated comparators then produce a difference report having the master template configuration options that are different than the existing project configuration options of each project. Next, the method selects, for each project, a sub-set of the master template configuration options from the difference report. Each project template has a specific sub-set of project configuration options to be updated from the difference report. Finally, the method updates, using the specific sub-set of template configuration options, the respective existing project configuration options for each project template to produce new existing project configuration options for each project template.

The method also may forward the new existing configuration options for each project to the central site, and update the updated master template configuration options using the new existing configuration options for each project. To that end, the updated master template configuration options may use one or more automated comparators, at the central site and/or staging area, to determine differences between the updated master template configuration options and the new existing configuration options for each project. One or more automated comparators then produce a further difference report having the updated master template configuration options that are different than the new existing configuration options for each project. The method may then select a sub-set of the new existing configuration options for each project from the further difference report, and further update the updated master template configuration options using the sub-set of the new existing configuration options for each project from the further difference report. The central site then may again update the updated master template configuration options after updating the updated master template configuration options using the new existing configuration options for each project.

The central site may be geographically remote from at least one of the project sites. Alternatively, the central cite may be geographically close to at least one of the project sites. In addition or alternatively, the plurality of project sites may have a physical site having a structure and a computer system. In some embodiments, the structure is remote from the computer system.

The method may use one or more automated comparators by first determining first differences between the updated master template configuration options and existing project configuration options for each project at the staging area(s), and then determining second differences between the updated master template configuration options and existing project configuration options for each project at one of the project site(s). Moreover, the method may select by enabling a person to select, for each project, the sub-set of the master template configuration options from the difference report.

Some embodiments may use one or more automated comparators at the staging area(s)—not at other areas.

In accordance with another embodiment, a CMS manages templates between a central site and a plurality of large-scale capital projects, where the plurality of large-scale capital projects execute multiple applications at a plurality of project sites. Specifically, the CMS includes a template generator at a central site. The template generator is configured to produce a master template for at least one large-scale capital project, and the master template has a plurality of master template configuration options. The CMS also has a central site updater configured to update the master template configuration options at the central site, and an interface at the central cite operatively coupled with the central site updater. The interface is configured to forward a project template to the plurality of project sites. In a manner similar to other embodiments, the project template is based on the master template and thus, may have thousands of project configuration options for developing the large-scale capital projects.

The interface also is configured to forward to the plurality of project sites and/or one or more staging areas the updated master template configuration options. Also like other embodiments, each project template has a set of existing project configuration options prior to receipt of the updated master template configuration options. One or more automated comparators of the CMS, at respective project sites and/or the staging area(s), are configured to determine differences between the updated master template configuration options and existing project configuration options for each project. The one or more automated comparators thus are configured to produce a difference report having the master template configuration options that are different than the existing project configuration options of each project.

To select appropriate configuration options, the CMS has a manual selection interface operably coupled with the one or more automated comparators. The manual selection interface enables a user to select, for each project, a sub-set of the master template configuration options from the difference report. Each project template preferably has a specific sub-set of project configuration options to be updated from the difference report. The CMS also has a project site updater configured to update, using the specific sub-set of template configuration options, the respective existing project configuration options for each project template to produce new existing project configuration options for each project template.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Illustrative embodiments optimize a configuration management system to efficiently update massive quantities of configuration data of a plant design program template used across a plurality of different project sites. Each of these project sites preferably is involved with a large-scale capital project. To that end, a central site directs configuration updates to the various project sites, which selectively update their local configuration databases. Both automated and manual processes combine to more efficiently and rapidly implement selected configuration updates at the project sites. Some embodiments improve project efficiency by utilizing a staging area to perform much of the comparison and update processing, minimizing downtime at the project site where hundreds of designers and engineers continue to work on the project. The project sites then forward their updated configuration data back to the central site for subsequent updating purposes. Among other benefits, this update process minimizes both the amount of time required to update the local template configuration databases, and the likelihood of user error during the update process. Details of illustrative embodiments are discussed below.

Figure 1A:
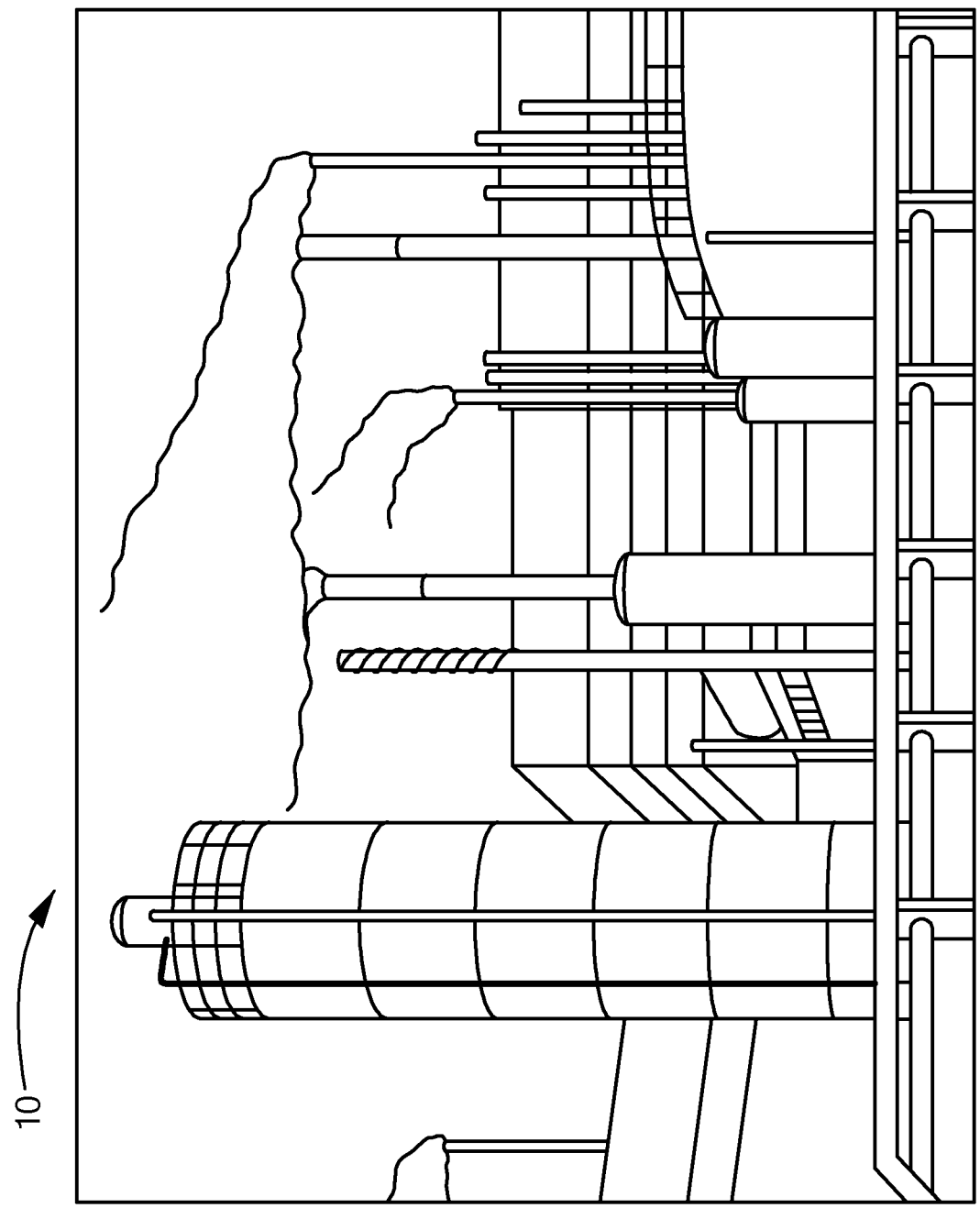
FIG. 1A schematically shows a part of a large-scale capital project that may use illustrative embodiments of the invention.

FIG. 1A generally shows a part of one example of a large-scale capital project 10 (more generally a "capital project 10") that may implement illustrative embodiments of the invention. More specifically, as known by those skilled in the art, a capital project 10 generally is a long-term investment made to build, augment, add, or improve on a highly capital intensive project—it requires notable amounts of both financial capital and labor capital to undertake, and often takes years to complete. Capital projects 10 are often defined by their large-scale cost relative to other investments requiring less planning and resources (e.g., building a house or a truck). Both the private sector and public sector can be involved in a capital project 10. Some examples of capital projects 10 include developing and maintaining oil refineries, power plants, ships, offshore oil platforms, dams, and factories.

The capital project 10 shown in FIG. 1A is a power plant, which, as known by those skilled in the art, has an enormous number of different components that cooperate to accomplish its function of generating power. For example, among other things, the power plant of this figure has a plurality of large and small buildings, smokestacks, pipes, valves, fuel tanks, ladders, and electrical systems. Indeed, designing, building, and maintaining such a project requires vast amounts of planning and coordination. Without careful planning and coordination, the power plant may never have been built or operated.

To that end, those skilled in the art have developed plant design programs/products ("plant design programs") to assist in planning/designing, developing, maintaining, and decommissioning capital projects 10, such as that shown in FIG. 1A. As noted above, one such widely used plant design program is known as the SmartPlant® Enterprise product (hereinafter "SmartPlant® product"), distributed by Intergraph, Inc. of Huntsville, Ala. In a manner similar to other such products, the SmartPlant® product has at least the following interrelated functions and components:
- 3D modeling and visualization,
- engineering and schematics,
- information management,
- procurement, fabrication, and construction,
- open integration with other proprietary and open systems.

Accordingly, designers, engineers, developers, managers and other relevant parties use these and other features of plant design programs, such as the SmartPlant® product, to design, build, update, manage, and decommission capital projects 10, such as the power plant 10 shown in FIG. 1A. As known by those skilled in the art, such 3D or 2D design programs often produce a template that, along with multiple software tools, serves as a principal mechanism for designing and managing their projects. Among other things, the template typically includes a plurality of options, configurations, and layouts that permit the user to more accurately and efficiently develop their project.

At the risk of oversimplifying various embodiments, one may analogize a template used in the large-scale capital project context to a word processing template that is displayed when a user opens a word processing program. Among other things, a word processing template may be configured to enable a user to select from multiple fonts, colors, shapes, line spacing, and formats. The user then begins preparing their document using the different options that the template provides. In fact, the word processing user can make any of a wide variety of different documents, such as a letter, a memo, a spreadsheet, a book, etc. In a similar manner, a template used for the capital project 10 also can be used with other, vastly different types of capital projects, such as those capital projects 10 noted above.

The configuration data of the template, however, often changes throughout the life cycle of the capital projects 10. Specifically, the template configuration required for the lifecycle of a capital project 10, such as the power plant of FIG. 1A, an oil refinery, or a ship, depends on many factors, including the needs of the owner, the specifics of the industry, and the available configuration options afforded by the software system being used at the various project site(s) 16. Configuration of such capital projects 10 typically includes thousands of types of items, such as custom properties, symbols, drawing templates, rules, etc. In addition, configuration requirements typically differ between the various lifecycle stages of the facility, such as between conceptual design, detailed design, commissioning, construction, operations, maintenance, decommissioning, etc.

Another level of complexity relates to the various software applications used at each project site. In particular, each software application executing at a project site may have its own set of configuration types and options, and specific methods to compare and update the configuration data, as well as the existing design data. In addition, these options and methods may change or depend on the specific version of the software applications. Yet another level of complexity involves an integrated system of applications, and the interdependence between the configuration types and the software applications.

Given these complexities, a plant owner or engineering company can easily spend years developing a complete set of template configurations to use with their plant design program. To avoid this potential delay, in illustrative embodiments, the owner or engineering company managing the project may use a partially completed template to start a project. Each individual project then may further configure applications (e.g., the plant design program) used for the project by modifying the configuration data inherited from the template to suit its needs and start the design process.

At some convenient time, typically between lifecycle stages, the owner or engineering company may need to update the configuration of the active project site(s) 16 to adopt some new or revised template configurations. This presents various technical problems solved by various embodiments. In particular, those technical problems may include:

1. The software application versions may be different between the template and the active project, possibly creating conflicts or difficulties in comparing or updating the configurations.

2. Each software application has its own set of configurations, dependencies, and methods to compare and update the configuration data/files.

3. The amount time to complete this comparison and update the configuration files preferably is kept to a minimum to reduce project downtime. It would be impractical, extremely time consuming, and error-prone to manually compare the dozens of properties of each and every one of the thousands of configuration items between the template and the active project, across multiple software applications.

4. There is a risk to the existing configuration and design data in the active project when updating its configuration.

Various embodiments mitigate some or all of these technical risks, and provide a robust and efficient method to compare the updated configuration data of an integrated template system with the configuration of an integrated active project. In addition, such embodiments preferably selectively update the configuration of the integrated active project based on the differences, thus not negatively impacting the active project configuration or existing design data. Furthermore, illustrative embodiments also can complete the process in reverse, meaning that a main or master template configuration can also be updated with differences that exist in the active project configuration(s).

Illustrative embodiments therefore may use a specially configured configuration management system ("CMS 17," FIG. 1B) to solve some or, preferably, all of these technical problems. Specifically, as known by those skilled in the art, to maintain system integrity, a CMS systematically manages configuration changes to a computer system or network over time. A CMS therefore can implement techniques, policies, tools, and procedures in a computer system or network to manage and evaluate changes in configurations and configuration options. To that end, FIG. 1B schematically shows an illustrative embodiment of a CMS that may be configured to more efficiently update configuration requirements of templates used for large-scale capital projects, such as the capital project 10 of FIG. 1A.

The CMS 17 of FIG. 1B includes a plurality of components that cooperate to efficiently update large-scale capital project template configuration options between a central site 12 and one or more project site(s) 16 (see FIG. 3 below for details of the central site 12 and project site(s) 16). Each of these components is operatively connected by a conventional interconnect mechanism. FIG. 1B simply shows a bus 19 communicating each the components. Those skilled in the art should understand that this generalized representation can be modified to include other conventional direct or indirect connections. Accordingly, discussion of the bus 19 is not intended to limit various embodiments.

The components include a template generator 18 that generates new templates, an updater 20 that updates templates, and a port/interface 22 to communicate with other components outside of the CMS 17 or in another part of the CMS 17 (e.g., an instance of the CMS 17 at another site). In addition, the CMS 17 also includes a manual user interface 24 that enables a person to manage the system and select certain configuration updates. Illustrative embodiments of the manual user interface 24 include a graphical user interface 24 ("GUI") with a presentation display that easily enables the user to locate configuration information, system information, etc., and select configuration data for the updater 20. The CMS 17 also has an automated comparator 26 to compare configuration data in a rapid and automated manner—without human comparison, and memory 28 that stores configuration data, such as in the form of a database.

Figure 1B:
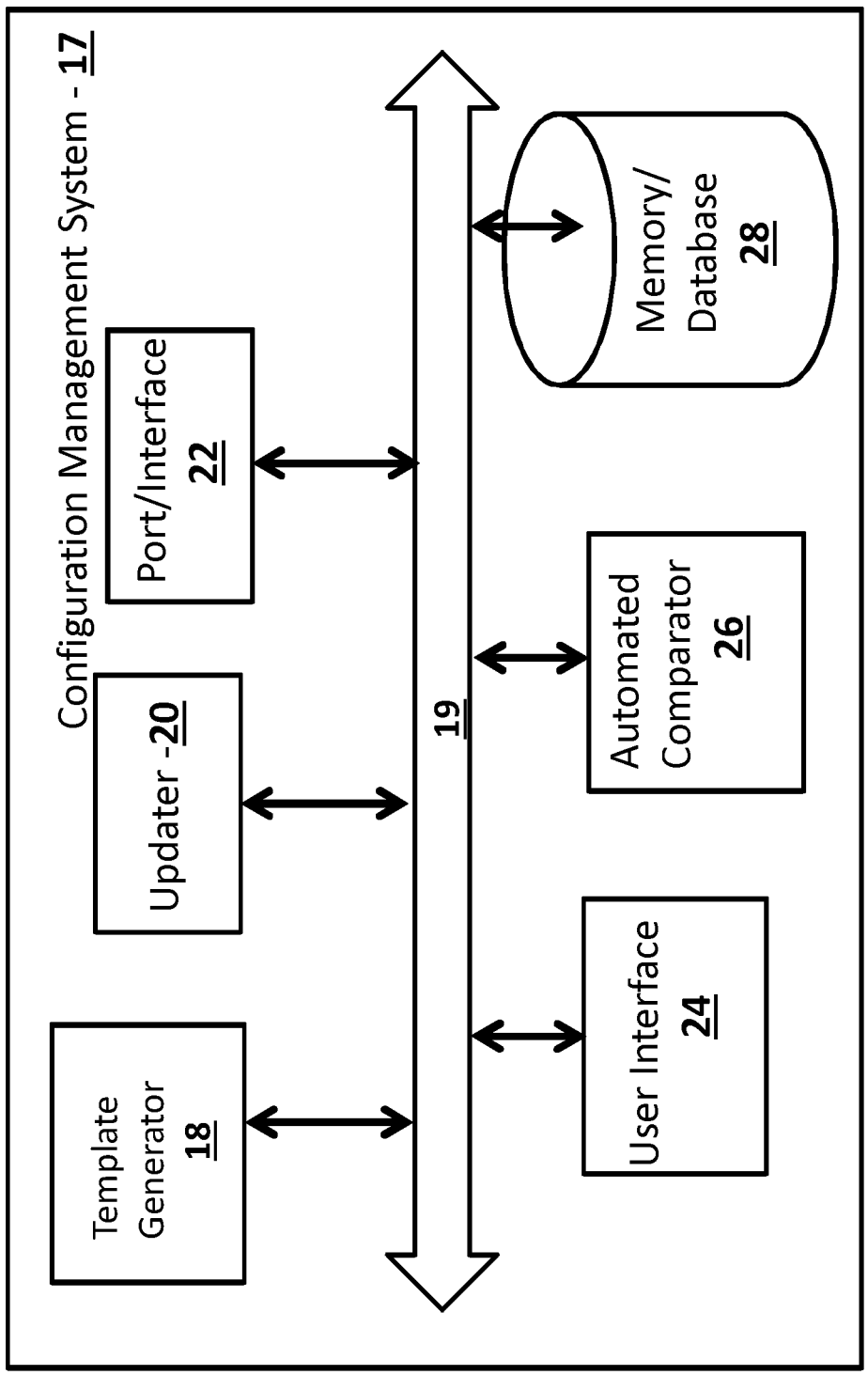
FIG. 1B schematically shows a portion of a configuration management system that may be used with illustrative embodiments of the invention.
Figure 2A:
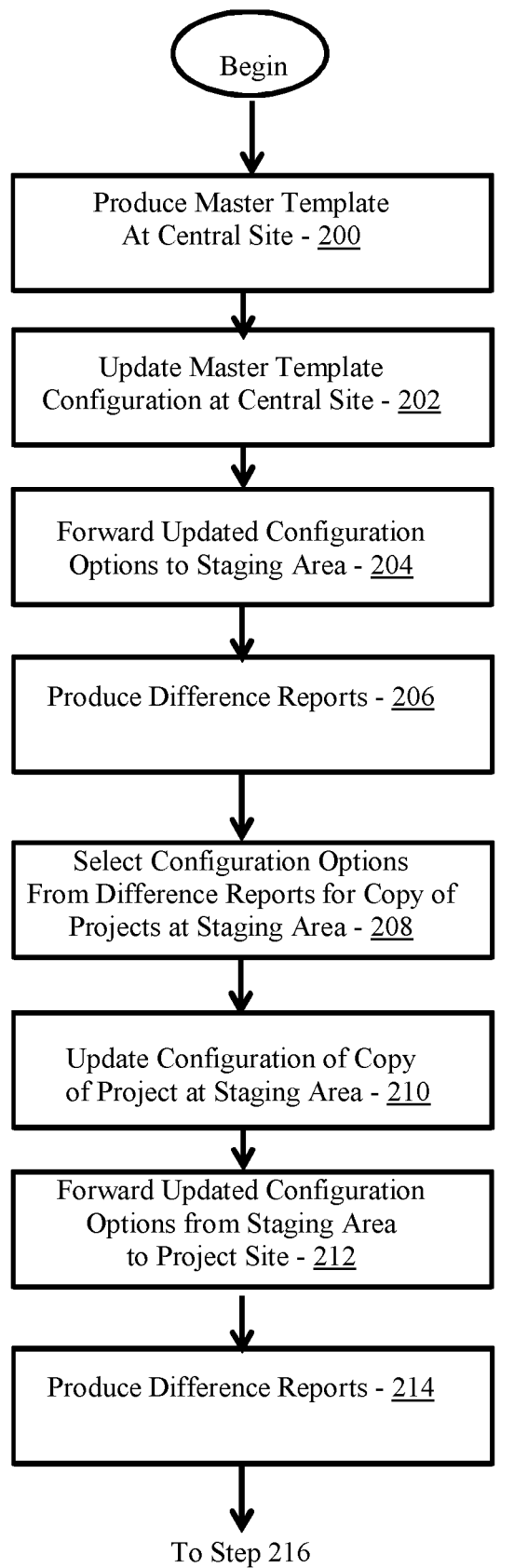
FIGS. 2A and 2B are a single flow-chart showing a process for managing CMS configuration information across multiple large-scale capital projects in accordance with illustrative embodiments of the invention.
Figure 2B:
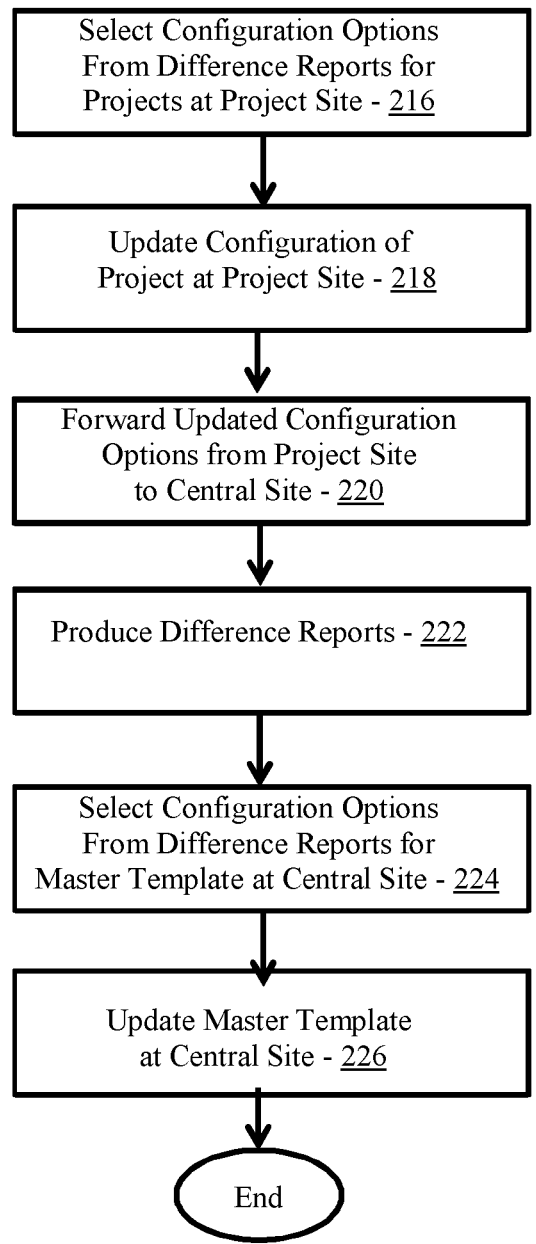

The CMS 17 of FIG. 1B can be implemented in a variety of manners. In one implementation, the CMS 17 may have local, independent, collaborating versions at different project site(s) 16 and at the central site 12. For example, the CMS 17 can locate one updater 20 at the central site 12 and another updater 20 at project site(s) 16. As another example, the interface 22 can be at the central site 12, at the project site(s) 16 (e.g., at least in part acting as an input or output port), and/or at some other location remote from both the central site 12 and the project sites(s) 16. Similarly, the CMS 17 may be distributed to span an entire network. In the latter embodiment, the components of FIG. 1B operate on both the central site 12 and various project site(s) 16. FIG. 2, discussed below, provides more details on how illustrative embodiments of the CMS 17 and its components function to provide the various technical benefits.

It should be noted that FIG. 1B only schematically shows each of these components. Those skilled in the art should understand that each of these components can be implemented in a variety of conventional manners, such as by using hardware, software, or a combination of hardware and software, across one or more other functional components. For example, the updater 20 may be implemented using a plurality of microprocessors executing firmware. As another example, the updater 20 may be implemented using one or more application specific integrated circuits (i.e., "ASICs") and related software, or a combination of ASICs, discrete electronic components (e.g., transistors), and microprocessors. Accordingly, the representation of the updater 20 and other components in a single box of FIG. 1B is for simplicity purposes only. In fact, as noted above, the components of FIG. 1B may be distributed across a plurality of different machines—they are not necessarily within the same housing or chassis.

It should be reiterated that the representation of FIG. 1B is a significantly simplified representation of an actual CMS. Those skilled in the art should understand that such a system typically has many other physical and functional components, such as central processing units, various utilities, controllers, short-term memory, etc. Accordingly, this discussion is not intended to suggest that FIG. 1B represents all of the elements of a CMS.

FIG. 2 shows a preferred process used by the CMS 17 for managing the configuration information in a manner that mitigates some or all of the above noted technical problems. It should be noted that this process may be considered to be simplified from a longer process that normally would be used to update template configuration data. Accordingly, the process of updating template configuration data may have many other steps that those skilled in the art likely would use. In addition, some of the steps may be performed in a different order than that shown, or at the same time. Those skilled in the art therefore can modify the process as appropriate.

The process of FIG. 2 begins at step 200, in which the template generator 18 produces a master template at a central area (the central site 12, noted above). More specifically, FIG. 3 schematically shows a geography or network across which various embodiments described in FIG. 2 update template configuration data. This network includes a central site 12 (typically is managed by some central authority) that directly communicates with a plurality of specific project site(s) 16, or via an intermediate staging area 14. In illustrative embodiments, the various sites/areas 12, 14, and 16 are geographically remote from each other. Other embodiments, however, may position one or all sites/areas 12, 14, 16 close to each other.

The central site 12 manages initial and template configuration updates, while the plurality of project site(s) 16 are the locations where a project is executed. For example, a central site 12 may be managed by a single entity, such as a large energy company or owner, while the project site(s) 16 may be separate power plants, fuel storage locations, drilling platforms, or other projects managed under the direction of the same energy company. Each of these different project site(s) 16 may be spaced many miles apart, or in a common area. Moreover, a project site 16 may have a physical site with a structure (e.g., a generator building) and a computer system (e.g., a computer system executing the update process, or some different process). The computer system may be in the same building as the structure, or remote from the structure.

While there certainly is expected to be some local management at the project site(s) 16, the central site 12 typically provides general management of the various projects, and facilitates collaboration among the various project site(s) 16 (e.g., if a project is executed at multiple locations). The project site(s) 16 use the template and plant design applications to form and manage the lifespan of a project. Accordingly, a project site 16 starts with the master template (e.g., Version 1.0) and transforms that master template into a project using the plant design program and related programs. As known by those skilled in the art, the plant design program/application uses the configuration options from the template, which are inherited by the project, to design and manage the project.

The staging area 14 is an intermediate location where template configurations may be at least partially updated and implemented for active project site(s) 16. As discussed in greater detail below, this staging area 14 effectively offloads some of the local configuration updating processes from the project site(s) 16, thus permitting the projects to continue operating without interruption. Some embodiments, however, may omit the staging area 14 and instead, perform more of the configuration update processing at the project site(s) 16, the central site 12, and/or some other region/area (depending on the process). Some embodiments that include the staging area 14 also may perform some of the processes directly at the project site(s) 16 and/or the central site 12. Accordingly, discussion of processing at the staging area 14 is not intended to suggest that such processes cannot be performed at the project site(s) 16 and/or the central site 12. Moreover, although not shown, some embodiments also have an intermediate CMS location for managing multiple configurations versions.

Figure 3:
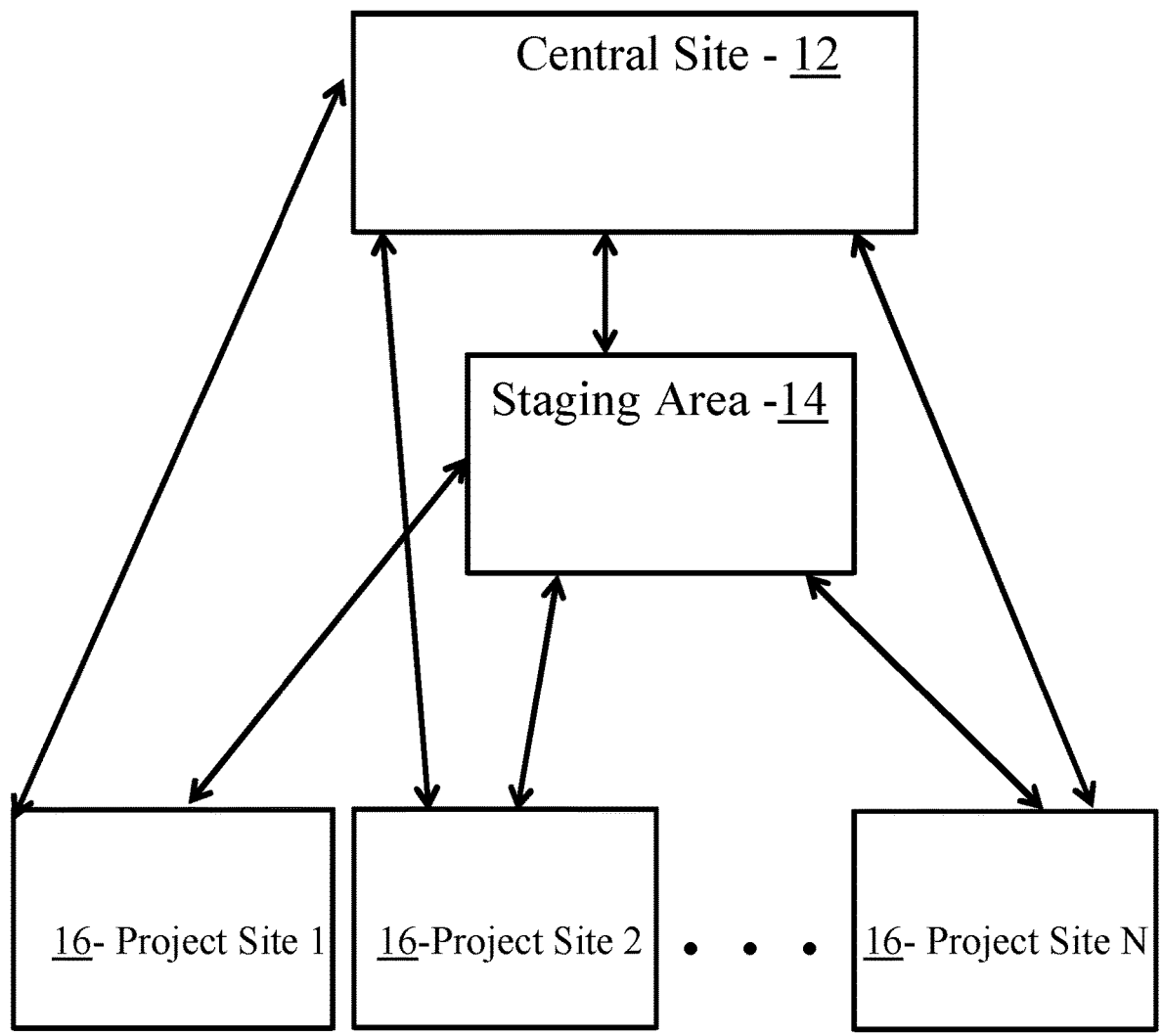
FIG. 3 schematically shows an environment that may implement illustrative embodiments of the invention.

It should be reiterated that FIG. 3 is a schematic drawing and thus, each block may represent one or a plurality of functional and/or physical entities. For example, the central site 12 may include a distributed computer network across a wide geography. Alternatively, the central site 12 may include just a single building or a single room in a single building. In a similar manner, the staging area 14 and project site(s) 16 also may or may not be geographically and/or logically widespread.

Returning to FIG. 2, step 200 creates the noted master template (at the central site 12) by first creating a template configuration that takes into account many or all of the software applications intended to be used at the plurality of project site(s) 16. Next, using the template generator 18 and/or some testing facility, step 200 also tests the configurations with sample data to create an initial master template. The configuration data/files then may be saved into the memory 28 of the CMS 17. As known by those skilled in the art, configuration data/files may include a set of options, settings, and reference data to be used to manage any of the projects at the project site(s) 16. For example, the configuration files may contain externalized configurations (from their applications) as used directly by software during design operations. Such configuration data also may include "configuration artefacts," which includes configuration data, or groups of configuration data, that normally are embedded within a database and packaged primarily for the purpose of externalization, safekeeping, and for comparison and update purposes. They are not necessarily directly used by application programs or the templates in normal operation.

Step 200 concludes by using the port/interface 22 to direct the template configuration information, along with the templates, to the project site(s) 16. After receiving the master template, the project site(s) 16 can begin their local processes that require the template (e.g., production, management, etc.). Accordingly, at this time, the local project site(s) 16 use the master template with its current copy of the configuration data.

After forwarding the template and its configuration data via its interface 22, the updater 20, at the central site 12, may begin updating software versions and template configuration information, and then update the configuration of the master template as needed (step 202). For example, this updated master template may be considered to be a Version 2.0. Accordingly, the central site updater 20 may save the updated configuration files with its configuration artefacts into the CMS memory 28 (e.g., Version 2.0 configuration information), and make a copy of the active project from the project site(s) 16 to the staging area 14 via the relevant interface 22. In a corresponding manner, this step also copies the updated configuration files to CMS memory 28 at the staging area 14 (step 204).

At this point, the staging area 14 has both configuration data from the project site(s) 16, as well as the updated configuration information from the updated master template. Accordingly, the Version 2.0 configuration data of the master template should be used to update the configurations of the active projects.

As noted above, this configuration data of the template may include hundreds of configuration types, such as graphical symbols, rules, properties, drawing templates, menus, etc. In addition, the configuration files may have hundreds of thousands of specific configuration items. This large number of configuration items within a single template can vary based upon a number of factors. For example, those factors may include software applications used at the project site(s) 16 and their integration,
  software version of those applications
  the interdependence between configuration types and software applications,
  the industries of the various projects (e.g., oil and gas, mining, chemical, power, etc.),
  the geographic location of the various project site(s) 16, local and regional laws, rules, and standards at the project site(s) 16,
  the stage of the project (conceptual, detail, design, construction, maintenance, decommissioning, etc.), and
  custom configuration items for each project and evolution of each project since it began development.

Indeed, an enormous amount of configuration data typically must be compared to determine the differences between the current configuration data used by the projects and the updated master template configuration data. To improve efficiency, illustrative embodiments use an automated apparatus, such as the automated comparator 26, to compare the two sets of configuration data (step 206). In other words, at the staging area 14, the automated comparator 26 compares the updated configuration data from the CMS memory 28 (sometimes referred to as a "source") with master template configuration data from the active project (sometimes referred to as a "target"). This step thus produces a report, referred to as "difference report," for the configuration data relating to each software application. Specifically, the difference report identifies the specific configuration items and/or data that are indicated as updated from the CMS updater 20 (i.e., from the central site 12). To that end, some embodiments of the difference reports have configuration items that exist in the source only, configuration items that exist in the target only, and configuration items that exist in both the source and the target, but are different. Such embodiments also may list those differences.

Step 208 then engages a responsible and knowledgeable user from each project site 16 (and/or preprogrammed intelligent logic) to review the difference report. Specifically, using the manual user interface 24, the user manually decide/selects which template configuration options/data (in the difference report) should be updated for their particular project at the staging area 14. Such user or logic should carefully consider the potential engineering impact on the existing design data in the project against the previous configurations. The updater 20 thus selectively updates their target project configuration data based on these decisions, and saves the configuration files/data in the CMS memory 28 (step 210). Despite this update, there still may be certain updated configuration data from the master template that still was not implemented into the update of the target project. If that occurs, then this final updated configuration data thus is configured as described immediately below.

Specifically, after the updated configuration information is forwarded from the staging area 14 to the project site(s) 16 (step 212), the project site(s) 16 now update their software application versions, and copy the configuration files last saved in the CMS memory 28. Again using the comparator 26, but this time at the project site(s) 16, the process compares the configurations between the configuration files copied from the CMS memory 28 against the configuration data of the active project itself at step 214. In a manner similar to step 206, this step produces another difference report for each software application listing: a) which configuration items exist in the source only, b) which configuration items exist in the target only, and c) those configurations that exist in both the source and the target, but are different (and list those differences in detail). This difference report may have less configuration information than the difference report described above because earlier processes already updated much of the configuration data.

Also like earlier processes, at step 216, a responsible and knowledgeable user from each project site 16, and/or preprogrammed intelligent logic, reviews this new difference report and, with the manual user interface 24, manually decides/selects which template configuration options/data should be updated for their particular project. Unlike the previous difference report, however, this difference report is produced at the project site 16. The updater 20 then selectively updates the target project configuration (step 218) based upon decisions made during step 216, and updates the CMS memory 28.

At this point, the templates at the project site(s) 16 are updated (for the time being) with configuration changes from the central site 12. Next, the process selectively updates the master template at the central site 12 with the appropriate configuration updates made to the project site template(s) since they initially received the latest master template (e.g., Version 2.0 of the master template). For example, some of these updates may apply to future projects. More specifically, despite the recent project site update discussed above, the project site(s) 16 also may have updated their templates with configuration information based on the evolution of their specific projects. Illustrative embodiments therefore update the master template with those applicable updates. Accordingly, updates flow in two directions between the project site(s) 16 and the central site 12. To that end, the process forwards updated configuration options/data from the project site(s) interfaces 22 to the central site 12 interface 22 (step 220) so that the central site 12 may update the master template with these project based updates.

Specifically, the process may copy/forward the recently revised project configuration files/data from the CMS memory 28 at the project sites(s) 16 to the central site 12. CMS comparators 26 at the central site 12 then compare the differences between the configuration files copied from the CMS memory 28 against the configuration data of the master template that it considers most up to date (e.g., Version 2.0). In a manner similar to earlier steps, this step produces another difference report (step 222) for each software application listing a) which configuration items exist in the source only, b) which configuration items exist in the target only, and c) those configurations that exist in both the source and the target, but are different (also listing those differences).

Also like earlier processes, a responsible and knowledgeable user from the central site 12, one or more project site(s) 16, and/or preprogrammed intelligent logic, reviews this new difference report and, using the manual user interface 24, manually decides which template configuration options/data of the master template should be updated from the project configuration(s) (step 224). Among other reasons, this step helps adopt revised best practices. Indeed, some specific configuration options of certain projects may not apply to other projects and thus, the user may not select such options. Next, the updater 20 updates the master configuration data as specified by this person and/or logic (step 226). After it is updated with updated configuration data, the central site 12 may test the new updated configuration data with sample data, and save that new configuration data that passed testing to create a new master template having the updated configuration data. The process thus concludes by saving the new configuration data/files in the CMS memory 28.

Steps 202 through 218 may repeat as the central site 12 produces new, updated configuration data (e.g., a Version 3.0 master template). Similar and related embodiments may repeat steps 202-226. Moreover, as noted above, other embodiments may omit processing in the staging area 14 and simply process at the central site 12 and the project site(s) 16.

As noted above, illustrative embodiments provide a number of technical benefits, such as one or more of the following:

1. Permits the safe and selective update of an evolving template configuration into an active project. It also allows the reverse operation, which is to "harvest" useful additional custom configurations made by project site(s) 16 back into the master template configuration for the benefit of future projects.

2. Use of multiple locations to safeguard the active design data and minimize production downtime (e.g., typically hundreds of engineers), while updating the active project's configuration data.

3. Use of comparators 26 with detailed differences reports of thousands or tens of thousands of properties to make well-informed and timely, efficient decisions.

4. The use of update utilities, to be used after comparisons, that allow selective updates of the target active project and preserve the existing configuration and the existing design data.

5. The work process directs correct sequencing of updates by software applications to maintain and preserve dependencies between them.

6. The CMS 17 (or other similar functionality) manages the various versions of the configuration files and configuration artefacts. This is important because in some cases, the comparator 26 requires that the template and the project being compared be on the same version of software. In addition, there may be many files from several products, and multiple versions of the configuration template. These files preferably are carefully managed because it may be necessary to update a project with the correct set of files from several versions back (software and configuration versions), which could be several years old. A precise naming convention therefore preferably is adopted for naming the configuration files and artefacts.

Compared to prior art CMS manual update process, illustrative embodiments provide robust, effective, efficient, and complete update of the desired configuration changes. Manual CMS and other methods would be too laborious, error-prone, and all-encompassing. In other words, comparing all the configuration items typically is not practical if attempted manually. The comparator utilities make the task possible, and clearly identify the differences, such as by using color-coding.

Various embodiments of the invention may be implemented at least in part in any conventional computer programming language. For example, some embodiments may be implemented in a procedural programming language (e.g., "C"), as a visual programming process, or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the methods described above) may be implemented as a computer program product for use with a computer system. Such implementation may include a series of computer instructions fixed either on a tangible, non-transitory, non-transient medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A computer-implemented configuration management system for managing templates between a central site and a plurality of large-scale capital projects, the plurality of large-scale capital projects executing multiple applications at a plurality of project sites, the configuration management system comprising:
    a computer configured to implement:
        a template generator at a central site, the template generator configured to produce a master template for at least one large-scale capital project, the master template having a plurality of master template configuration options;
        a central site updater configured to update the master template configuration options at the central site;
        an interface at the central site operatively coupled with the central site updater, the interface being configured to forward a project template to the plurality of project sites, each of the project sites being remote from the central site, the project template having thousands of project configuration options for developing the large-scale capital projects, the project template being based on the master template,
        the interface also being configured to forward to the plurality of project sites and/or one or more staging areas the updated master template configuration options, each project template having a set of existing project configuration options prior to receipt of the updated master template configuration options;
    the configuration management system further comprising:
    one or more automated comparators, at respective project sites and/or the staging area(s), configured to determine differences between the updated master template configuration options and existing project configuration options for each project, the one or more automated comparators being configured to produce a difference report having the master template configuration options that are different than the existing project configuration options of each project;
    a manual selection interface operably coupled with the one or more automated comparators, the manual selection interface enabling a user to select, for each project, a sub-set of the master template configuration options from the difference report, each project template having a specific sub-set of project configuration options to be updated from the difference report; and
    a project site updater configured to update, using the specific sub-set of template configuration options, the respective existing project configuration options for each project template to produce new existing project configuration options for each project template.

2. The configuration management system as defined by claim 1 further comprising:
    a project output operatively coupled with the project site updater, the project output being configured to forward the new existing configuration options for each project to the interface at the central site; and
    the central site updater being configured to update the updated master template configuration options using the new existing configuration options for each project.

3. The configuration management system as defined by claim 2 wherein the central site updater is configured to:
    determine differences between the updated master template configuration options and the new existing configuration options for each project, and produce a further difference report having the updated master template configuration options that are different than the new existing configuration options for each project,
    permit a user to select a sub-set of the new existing configuration options for each project from the further difference report, and
    further update the updated master template configuration options using the sub-set of the new existing configuration options for each project from the further difference report.

4. The configuration management system as defined by claim 2 wherein the central site updater is configured to again update the updated master template configuration options after updating the updated master template configuration options using the new existing configuration options for each project.

5. The configuration management system as defined by claim 1 wherein the central site is geographically remote from at least one of the project sites.

6. The configuration management system as defined by claim 1 wherein the plurality of project sites includes a physical site having a structure and a computer system.

7. A method of managing template configuration information with a CMS across a plurality of large-scale capital projects, the plurality of large-scale capital projects executing multiple applications at a plurality of project sites, the method comprising:
    forwarding, from a central site having a master template with a plurality of master template configuration options, a project template to the plurality of project sites, the project template having thousands of project configuration options for developing the large-scale capital projects, the project template being based on the master template;
    updating, at the central site, the master template configuration options;

forwarding to the plurality of project sites and/or one or more staging areas, from the central site, the updated master template configuration options, each project template having a set of existing project configuration options prior to receipt of the updated master template configuration options;

using one or more automated comparators, at respective project sites and/or the staging area(s), to determine differences between the updated master template configuration options and existing project configuration options for each project, the one or more automated comparators producing a difference report having the master template configuration options that are different than the existing project configuration options of each project;

selecting, for each project, a sub-set of the master template configuration options from the difference report, each project template having a specific sub-set of project configuration options to be updated from the difference report; and updating, using the specific sub-set of template configuration options, the respective existing project configuration options for each project template to produce new existing project configuration options for each project template.

8. The method as defined by claim 7 further comprising:
forwarding the new existing configuration options for each project to the central site; and
updating the updated master template configuration options using the new existing configuration options for each project.

9. The method as defined by claim 8 wherein updating the updated master template configuration options comprises:
using one or more automated comparators, at the central site and/or staging area, to determine differences between the updated master template configuration options and the new existing configuration options for each project, the one or more automated comparators producing a further difference report having the updated master template configuration options that are different than the new existing configuration options for each project;
selecting a sub-set of the new existing configuration options for each project from the further difference report; and
further updating the updated master template configuration options using the sub-set of the new existing configuration options for each project from the further difference report.

10. The method as defined by claim 8 comprising again updating the updated master template configuration options after updating the updated master template configuration options using the new existing configuration options for each project.

11. The method as defined by claim 7 wherein the central site is geographically remote from at least one of the project sites.

12. The method as defined by claim 7 wherein using one or more automated comparators comprises first determining first differences between the updated master template configuration options and existing project configuration options for each project at the staging area(s), and then determining second differences between the updated master template configuration options and existing project configuration options for each project at one of the project site(s).

13. The method as defined by claim 7 wherein selecting comprises a person selecting, for each project, the sub-set of the master template configuration options from the difference report.

14. The method as defined by claim 7 wherein the plurality of project sites includes a physical site having a structure and a computer system.

15. The method as defined by claim 14 wherein the computer system at the physical site is remote from the structure.

16. The method as defined by claim 7 wherein:
forwarding to the plurality of project sites or one or more staging areas comprises forwarding to the one or more staging areas,
further wherein using one or more automated comparators, at respective project sites and/or the staging area(s), comprises using one or more automated comparators at the staging area(s).

17. A computer program product for use on a computer system for managing CMS template configuration information across a plurality of large-scale capital projects, the plurality of large-scale capital projects executing multiple applications at a plurality of project sites, the computer program product comprising a tangible, non-transient computer usable medium having computer readable program code thereon, the computer readable program code comprising:

program code for forwarding, from a central site having a master template with a plurality of master template configuration options, a project template to the plurality of project sites, the project template having thousands of project configuration options for developing the large-scale capital projects, the project template being based on the master template;

program code for updating, at the central site, the master template configuration options;

program code for forwarding to the plurality of project sites and/or one or more staging areas, from the central site, the updated master template configuration options, each project template having a set of existing project configuration options prior to receipt of the updated master template configuration options;

program code for using one or more automated comparators, at respective project sites and/or the staging area(s), to determine differences between the updated master template configuration options and existing project configuration options for each project, the one or more automated comparator producing a difference report having the master template configuration options that are different than the existing project configuration options of each project;

program code for selecting, for each project, a sub-set of the master template configuration options from the difference report, each project template having a specific sub-set of project configuration options to be updated from the difference report; and program code for updating, using the specific sub-set of template configuration options, the respective existing project configuration options for each project template to produce new existing project configuration options for each project template.

18. The computer program product as defined by claim 17 further comprising:
program code for forwarding the new existing configuration options for each project to the central site; and program code for updating the updated master template configuration options using the new existing configuration options for each project.

19. The computer program product as defined by claim 18 wherein the program code for updating the updated master template configuration options comprises:
  program code for using one or more automated comparators, at the central site and/or staging area, to determine differences between the updated master template configuration options and the new existing configuration options for each project, the one or more automated comparators producing a further difference report having the updated master template configuration options that are different than the new existing configuration options for each project;
  program code for selecting a sub-set of the new existing configuration options for each project from the further difference report; and
  program code for further updating the updated master template configuration options using the sub-set of the new existing configuration options for each project from the further difference report.

20. The computer program product as defined by claim 18 comprising program code for again updating the updated master template configuration options after updating the updated master template configuration options using the new existing configuration options for each project.

21. The computer program product as defined by claim 17 wherein the program code for using one or more automated comparators comprises program code for first determining first differences between the updated master template configuration options and existing project configuration options for each project at the staging area(s), and program code for then determining second differences between the updated master template configuration options and existing project configuration options for each project at one of the project site(s).

22. The computer program product as defined by claim 17 wherein program code for selecting comprises program code for providing a manual user interface or enabling a person to select, for each project, the sub-set of the master template configuration options from the difference report.

* * * * *